Figure 1:
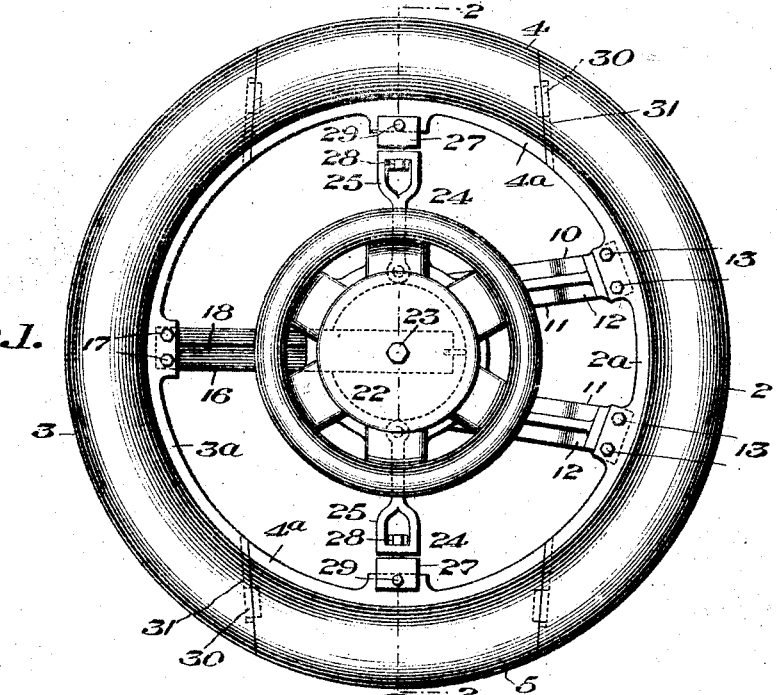

Oct. 27, 1925.

A. J. FLEITER 1,558,603

COLLAPSIBLE CORE

Filed April 6, 1922 2 Sheets-Sheet 1

Inventor
Andrew J. Fleiter

Attorney

Oct. 27, 1925.
A. J. FLEITER
1,558,603
COLLAPSIBLE CORE
Filed April 6, 1922   2 Sheets-Sheet 2
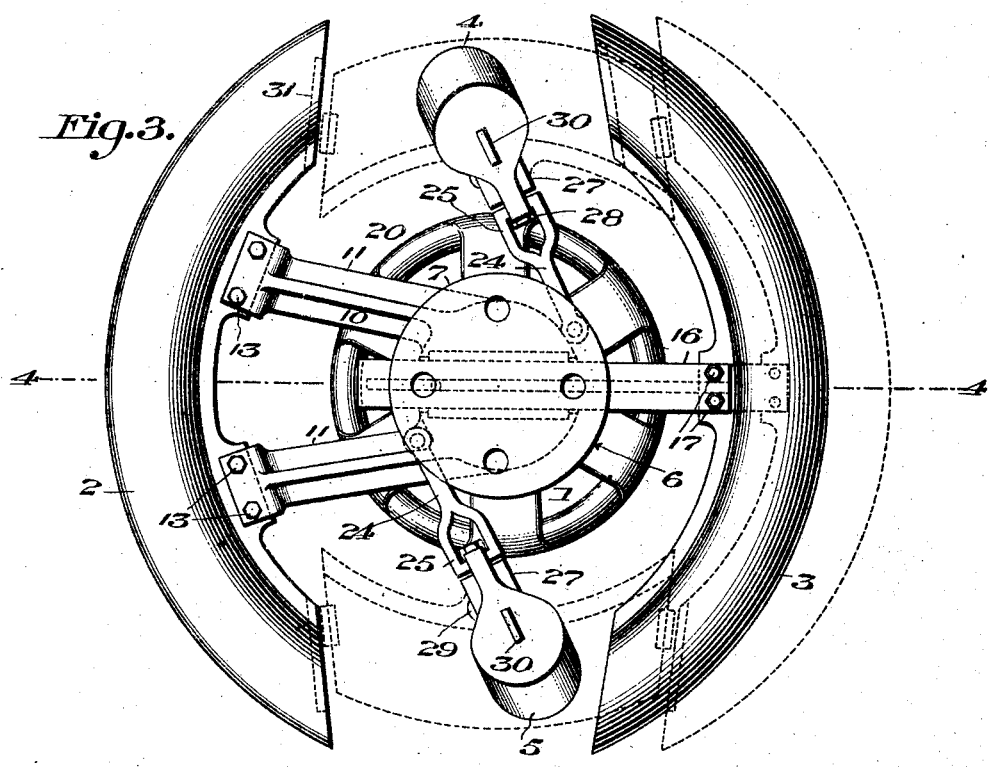
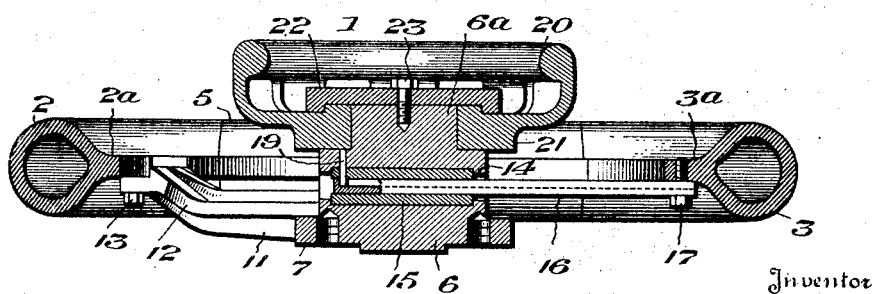
Inventor
Andrew J. Fleiter
By G. L. Ely
Attorney Patented Oct. 27, 1925.

1,558,603

UNITED STATES PATENT OFFICE.

ANDREW J. FLEITER, OF AKRON, OHIO.

COLLAPSIBLE CORE.

Application filed April 6, 1922. Serial No. 549,967.

*To all whom it may concern:*

Be it known that I, ANDREW J. FLEITER, a citizen of the United States, residing at Akron, in the county of Summit and State of Ohio, have invented certain new and useful Improvements in Collapsible Cores, of which the following is a specification.

My invention relates, broadly, to cores of the annular type, and it has particular reference to sectional collapsible cores for use in the tire building industry, or in any other capacity in which annular cores are required.

This invention relates particularly to that type of collapsible core in which several sections are provided, which sections are permanently attached to a collapsing mechanism, whereby, when the tire is built thereon, the core can be collapsed and the tire removed from vulcanization. The core can then be restored to its complete form and immediately used for building tires.

The invention also comprehends a core the component parts of which may be operated in the above described manner, while the structure is mounted for rotary movement.

Other objects and advantages, such as simplicity of construction and relatively low cost of manufacture, will appear and the nature of the invention will be more fully understood when the following description and claims are read in conjunction with the drawings accompanying and forming a part of this specification.

Figure 2:
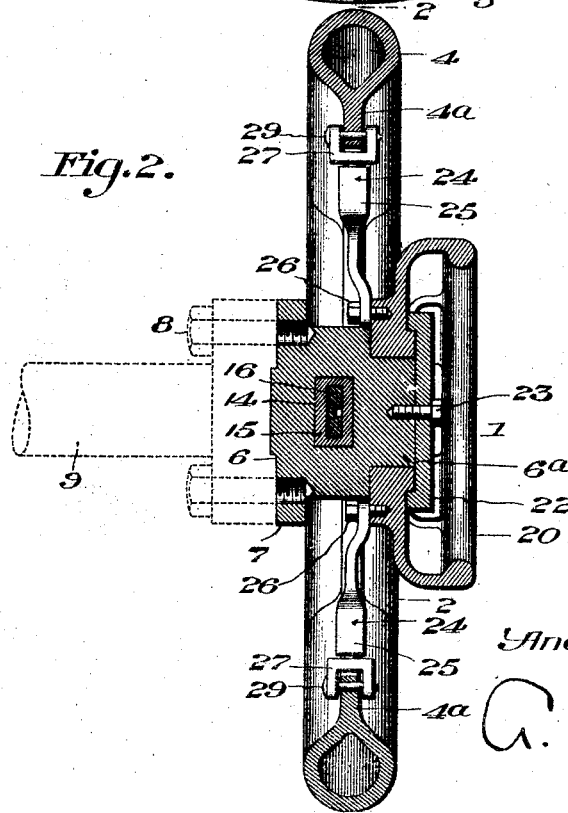

In the drawings:

Fig. 1 is a front elevational view, illustrating the core of my invention with its component parts in assembled relation, Fig. 2 is a vertical sectional view, on an enlarged scale, taken on the line 2—2 of Fig. 1, Fig. 3 is a rear elevational view, on an enlarged scale, illustrating, in full lines, the position of the component parts of the core when it is collapsed, and, in dotted lines, an intermediate position of certain of its sections, and, Fig. 4 is a horizontal sectional view, taken on the line 4—4 of Fig. 3, the parts of the core being in assembled relation.

Reference being had to the drawings by numerals, the invention will now be described in detail. Briefly, it comprises a chuck, or hub proper 1, a relatively long segmental section 2 fixed with respect to the chuck, a relatively long segmental section 3, movably mounted upon the chuck in diametrically opposite relation to the section 2, and oppositely disposed relatively short key sections 4 and 5, adapted to mate with the sections 2 and 3, to form an annulus in conjunction therewith.

The chuck comprises a hub member proper, designated by the numeral 6 that is provided at its rear with a flange 7 whereby it is adapted to be secured, as by the bolts 8, or in any other suitable manner to a rotatable drive shaft 9. The drive shaft 9, shown in dotted lines only, forms, per se, no part of the present invention and merely serves to illustrate one manner in which the chuck 1 may be supported for rotation. Upon the hub member 6 a spider 10 is affixed, either by forming it integrally with the hub or otherwise if desired, for the purpose of supporting the section 2, in fixed concentric relation to the chuck. Preferably the spider comprises two arms 11 which diverge from the hub 6 and are positioned with their major portions to the rear of the longitudinal center of the chuck. At their outer ends 12 the arms 11 are offset toward said center of the chuck 1 and to these outer ends the section 1 is secured, as by bolts 13, which pass through a radial flange 2$^a$ upon the section. Forwardly of the spider 10, but slightly in the rear of the longitudinal center of the chuck 1 a transverse diametrical aperture 14 is provided in the hub 6, said aperture having a sleeve 15 of Babbitt metal therein. The aperture 14 and sleeve 15 are disposed in diametrical relation with respect to the section 2, and are of preferably rectangular form in cross-section, as shown in Fig. 2, for a purpose presently apparent.

A radially extending bar or support, 16, also of rectangular form in cross-section is mounted at its inner end for sliding movement in the sleeve 15. At the outer end of the bar the section 3 is secured, as by bolts 17 passing through a radial flange 3$^a$ of the section, whereby said section 3 is mounted for reciprocable movement, in the plane of the core. Preferably the bar 16 is provided with a longitudinal groove 18, terminating short of the inner end thereof, which is designed to receive the inner end of a pin 19 disposed in the hub and projecting into the sleeve 15. By this means outward movement of the bar 16 is limited to position properly the section 3 in assembling the various sections of the core into annular form.

At the forward end of the hub 6 a hand wheel 20 is provided for rotary movement thereon. Preferably the wheel 20 embodies a rearwardly projecting flange 21 that is mounted concentrically of the hub on a reduced portion 6ª thereof, and in advance of the longitudinal center of said hub. A cap plate 22 bolted to the hub as at 23, serves, in this instance, to secure the wheel 20 upon the reduced portion 6ª. It will be noted that the relative disposition of the flange 21, the bar 16, and the major portion of the arms 11 of the spider provides for a clearance about the hub 6 in the plane of the assembled sections, and for a purpose presently apparent.

The key sections 4 and 5 are adapted to be connected to the flange 21 in such manner that they may be drawn inwardly and substantially radially of the chuck and then turned into parallelism with the axis of the chuck, or into angular position relative to the plane of the core, whereby the section 3 may be moved inwardly toward the section 2. As a preferred means of accomplishing this operation, a swiveled mounting 24 is provided between each key section and the flange 21 of the hand wheel 20. Each mounting 24 includes a yoke arm 25, which in the assembled position of the core section projects radially from the hub 6. At their respective inner ends each arm 25 is pivoted for movement as at 26, upon the flange 21, about an axis parallel with the axis of rotation thereof and in the clearance previously mentioned about the hub 6. At their outer, or yoke ends, each arm 25 is provided with a clip 27 pivoted by a bolt 28 upon its arm for movement about an axis at substantially a right angle to the pivotal axis of said arm. Each key section is bolted to the clip 27 of its mounting 24 for relative movement thereon by a bolt 29 that is disposed at a right angle to the aforesaid bolt 28, and extends through a radial flange 4ª upon each section.

In order to facilitate their assembly the ends of the key sections are inclined to converge toward the periphery of each section and the ends of the sections 2 and 3 are correspondingly inclined as shown in the drawings. Also key and key-way connections 30 and 31 respectively, may be provided upon the opposed ends of the sections if desired to assist in aligning the sections during their assembly.

The operation of my invention is as follows: Assuming that the sections 2, 3, 4 and 5 are in their assembled or mated relation, the operator, upon desiring to remove a tire carcass from the core will first rotate the wheel 20 in either direction. This action first unlocks the key sections 4 and 5 by moving their mountings 24 from their dead center position, and then swings said mountings about the axis of the hub 6, gradually drawing each key section inwardly in the manner shown in dotted lines in Fig. 3 of the drawings. After the key sections have been drawn inwardly so that the keys 30 are disengaged from the key-ways 31 and their outer peripheries are within the inner peripheries of the sections 2 and 3, the key sections are turned upon their mountings 24 until they are substantially parallel with the axis of the hub 6, whereupon the section 3 may be moved inwardly by virtue of its slidable mounting upon the hub 6. The annulus is broken in this manner and its sections so far removed from their assembled position that the carcass or article therein may be readily removed from the section 2.

The operation in assembling the core will be obvious, it is believed, from the foregoing.

It is to be understood that the present disclosure is illustrative in character and not to be construed as in any way limiting the scope or spirit of the invention unless such limitations are particularly specified in the claims appended hereto.

I claim:

1. An annular core comprising, a hub portion, a fixed segmental section mounted concentrically of the hub member, a second segmental section mounted in diametrically opposite relation to said first member for reciprocable movement upon the hub and in the plane of the core, oppositely disposed key sections adapted to be positioned between opposed ends of said first and second sections, a rotatable element upon the hub, and a connection between the rotatable element and each key section including a link having a pivotal connection to said element and a swivel connection to said section.

2. In a sectional core construction a radially movable core section, a central hub, a rotatable member upon the hub, a link pivoted to the rotatable member and a swiveled yoke in the end of the link for connecting the core sections to the link.

3. In a sectional core construction, a radially movable core section, a central hub, a link connecting the hub and the section, a yoke on the section and a radial pivot on the yoke to permit rotation of the section at an angle to the plane of the core.

ANDREW J. FLEITER.